United States Patent Office 3,483,144
Patented Dec. 9, 1969

3,483,144
PROCESS FOR THE PREPARATION OF A POLYIMIDE FOAM
Edward Lavin, Longmeadow, and Irving Serlin, Springfield Mass., assignors to Monsanto Company, St. Louis, Mo., a corporation of Delaware
No Drawing. Filed July 27, 1966, Ser. No. 568,106
Int. Cl. C08g 20/32, 20/20
U.S. Cl. 260—2.5        13 Claims

ABSTRACT OF THE DISCLOSURE

Disclosed herein is a process for the preparation of a polyimide foam which comprises preparing a foamable polymer forming composition by intimately mixing a polycarboxylic component selected from the group consisting of tetracarboxylic dianhydrides and free tetracarboxylic acid and a polyamine to form a system having a volatile content of at least 6.2% and then heating the mixture to at least the temperature at which foaming occurs contemporaneously with the polymerization of the reactants. Also disclosed are foamable powders and polyimide foams.

---

This invention relates to a new process for the preparation of polyimide foams. More particularly, it relates to a process for the direct preparation of polyimide foams from monomeric polyamine components and monomeric polycarboxylic acid components.

The unique physical properties of polyimides, e.g., organic solvent resistance, thermal stability, etc., had led to their use in such diverse applications as heat shields in aircraft and missiles, electrical insulators, gasket materials, heat resistant structural adhesives, glass laminates, etc. These polyimide materials are commonly used in the form of varnishes, films, filaments, etc. The growth of technology in the above and related areas has created a need for the preparation of a new form of polyimide resins, i.e., polyimide foams. However the physical properties that make the polyimides so desirable in many applications has precluded the ready production of polyimide foams. British Patents 999,578 and 999,579 describe methods for the production of polyimide foams prepared from a polyimide acid solution which involves (1) selecting a polyamide-acid solution with a critical viscosity, (2) introducing bubbles into the polyamide-acid solution, (3) shaping the mass and (4) forming the polyimide. While the technology presented in the British patent has advanced the state of the art, it has not proceeded far enough to meet the needs of the present-day requirements.

The present technology is limited to the concept of selecting a polymer with certain critical requirements and foaming that polymer. A definite need exists for a process for the preparation of polyimide foams wherein the foam and the polymer can be prepared directly and contemporaneously from polyamine and polycarboxylic acid monomeric components without the necessity of preparing polyamide acid solutions of a critical viscosity.

A further need exists for a process wherein the polyimide foam may be prepared in an operation wherein the foaming and polymerizing of the monomeric components occur contemporaneously without the need for separate processing steps as are outlined in the above-mentioned patents.

Furthermore, some types of applications create a need for a material which can be polymerized and foamed in situ without the use of external means such as agitation and/or blowing agents to introduce bubbles into the composition.

Lastly, a need exists for a polyimide foam which can be produced readily over a wide density range and in diverse shapes and sizes without the need for external agitation.

It is an object of this invention to provide a process for the preparation of polyimide foams wherein the foam is prepared directly from the polyamine and polycarboxylic acid monomeric components.

It is a further object of this invention to provide polyimide foams.

It is a further object of this invention to provide objects insulated with a polyimide foam.

It is a further object of this invention to provide shaped articles prepared from polyimide foams.

These and other objects are obtained by a process for the preparation of a polymeric polyimide foam which is the reaction product of:

(A) polycarboxylic acid compounds containing from 4–6 carboxylic acid groups wherein the polycarboxylic compounds are selected from the group consisting of polycarboxylic acids and polycarboxylic anhydrides and mixtures thereof; and
(B) a polyamine selected from the group consisting of amino compounds containing from 2–6 amino groups per molecule wherein the process comprises mixing at least one component from (A) and (B) above to form a system having a volatile content of at least 6.2% and then heating this mixture to at least the temperature at which foaming occurs contemporaneously with the polymerization of the polycarboxylic and polyamine components.

The present invention lies in selecting a system comprising a polycarboxylic acid component and a polyamine component which are capable of condensation polymerization, which system has a critical percent volatile content such that the polycarboxylic acid and polyamine reactants will polymerize and foam contemporaneously upon being heated to a critical temperature which varies with the particular reactant system used as well as with the volatile content of that system. The term polycarboxylic acid component is used in regard to this invention to include both free polycarboxylic acids and the anhydride derivatives of these acids.

The percent volatile content of the system is measured by the weight loss occurring in a 1–5 gram sample of the system which is heated at 300° C. for 10 minutes. This value is calculated as follows:

$$\frac{\text{Original sample weight} - \text{wt. of sample after heating}}{\text{original sample weight}} \times 100\% = \text{percent volatiles}$$

The percent volatiles in systems such as described in this invention is due to any solvent used to dissolve the monomeric reactants and to the water evolved during the condensation polymerization which occurs upon heating. As is readily apparent to those skilled in the art, the volatile content of the system, due solely to the evolution of water of condensation, will decrease as polymerization occurs. Once the volatile content of the system falls below critical percent volatile content, which critical limit varies from system to system, no foaming will take place regardless of the temperature at which the system is heated.

The minimum critical temperature necessary to cause foam formation is defined as that temperature at which the polymerization reaction and the foaming process occur contemporaneously. Although these two reactions usually proceed together, it is not necessary that they start together or end together or even be of the same duration in time. This minimum critical temperature may be further defined as that temperature at which the carboxylic acid component and the polyamine component, or salts formed from these reactants, will polymerize while contemporaneously foaming, to give a product that is a polymer foam. The concept is radically different from the usual method of first polymerizing and then adding foaming agents to the polymer to form a foamed polymer.

The temperatures necessary to produce the polyimide foams of this invention will depend upon the particular reactants used as well as upon such factors as carrying out the reaction under atmospheric, super-atmospheric or sub-atmospheric conditions as well as upon the use of catalysts, blowing agents, surface active agents, nucleating agents, etc., as are discussed below. In general, the co-reactants must be heated to at least their minimum critical temperature in order to polymerize the reactants while contemporaneously forming the foam. The heating time will likewise vary with the reactants as well as with the above-mentioned conditions. In general, the polyimide polymer structure will form more rapidly at elevated temperatures, i.e., temperatures about one hundred degrees or more above the minimum critical temperature of the system.

Conversely, the selection of temperature conditions which is at or slightly above the reaction temperature of the polycarboxylic acid/polyamine components or salts formed from these components will require a longer heating time in order to form the polyimide polymer structure. It should be noted in regard to the case of using temperatures at or slightly above the minimum critical temperature of the system, that the foaming of the mass will usually occur at the start of the polymerization reaction, but will end prior to the completion of the polyimide polymers structure.

In determining specific volatile content and a specific temperature necessary for preparing foams in the practice of this invention several factors must be considered. The minimum permissible percent volatile content and critical temperature will depend on the particular polycarboxylic acid and polyamine components chosen, the particular solvent system (in the event that a solvent based system is used instead of an intimate mixture of dry reactants) the type of foam desired, etc.

Inherent in the concept of this invention is heating the reactants until foam formation takes place. The time required for foam formation to take place will vary with the system. Generally the foaming process takes place within 30 minutes as is evidenced by the working examples.

Once the polyimide foam is formed, it may be post cured at temperatures up to 372° C. for as long as 24 hours with no substantial change in the properties of the foam.

The following examples are set forth in illustration of the invention and should not be construed as limitations thereof. All parts and percentages given are by weight, unless otherwise indicated.

EXAMPLE I

This example illustrates the direct preparation of a polyimide foam from a tetracarboxylic acid monomer and a diamine monomer having a volatile content of 15.4% which is due to the evolution of the water of condensation.

38.8 grams of benzophenone tetracarboxylic acid (BTA) and 10.8 grams of meta-phenylene diamine (m-PDA) are intimately ground together in a ball mill for one hour to form a finely divided mixture with a volatile content of 15.8%. This mixture is sprinkled in a tray and placed in an oven preheated to 300° C. for 10 minutes to form a tough, non-compressible foam having a density of about 22 lbs./cu. ft. This foam did not burn when held in an open flame.

EXAMPLE II

This example illustrates the direct preparation of a polyamide foam from a tetracarboxylic acid monomer and a diamine monomer.

35.8 grams of benzophenone tetracarboxylic acid (BTA) and 19.8 grams of methylene dianiline are intimately ground together in a ball mill to form a reactant system having a volatile content of 13.6%, which is due primarily to the water of condensation evolved during polymerization. This mixture is sprinkled in a tray and placed in an oven preheated to 300° C., for 10 minutes to form a tough, non-compressible foam having a density of about 22 lbs./cu. ft. This foam did not burn when held in an open flame.

EXAMPLE III

Example I is repeated here except that 20.0 grams of 4,4'-oxydianiline are used as the diamine component to form a system with a volatile content of 13%. The co-reactants are heated at 300° C. for 5 minutes to form a tough foam, having a density of about 23 lbs./cu. ft., which does not burn when held in an open flame.

EXAMPLE IV

This example illustrates the use of a tertiary amine as a foaming aid.

38.8 grams of benzophenone tetracarboxylic acid and 10.8 grams of m-phenylene diamine are intimately ground together using a mortar and pestle. This mixture is wetted with 4.0 grams of pyridine and then heated in a 250° C. oven for 10 minutes to give a foam comparable to that of Example I despite the lower temperature used to foam the reactants.

EXAMPLE V

This example illustrates the criticality of the volatile content of the system and the need for heating the system to the minimum critical temperature. The reactants of Example I having a volatile content of 15.8% are heated at 175° C. to reduce the volatile content to 4.4%, which value represents about 28% of the maximum percent volatiles of the system due solely to the evolution of the water of condensation. No appreciable foaming took place at this temperature. The material is reground and then heated at 300° C. for 10 minutes according to the procedure of Example I except that no foam is formed.

The lack of foam formation in the foregoing example is attributed to the fact that there are insufficient volatiles (4.4%) left in the system to cause the reactants to foam as they polymerize. The lack of foam formation when the reactant mixture is first heated at 175° C. is attributed to the fact that polymer formation at this temperature takes place slowly with a gradual evolution of water. The gradual evolution of volatiles is insufficient to foam the mass. In Example I, the same system gave a foamed polymer when it was heated at 300° C. indicating that foaming does not take place with polymerization except at temperatures above the minimum critical temperature.

EXAMPLE VI

This example illustrates the use of a foamable system that contains volatiles well in excess of the volatiles due solely to the evolution of the water of polymerization.

The reactants of Example I are wetted with dioxane to form a system that contains about 27% volatiles.

These volatiles are due to the dioxane and the water of condensation evolved as the reactants polymerize. Five grams of this system are placed in a vented cylindrical container and heated at 300° C. for 10 minutes to form a rigid foam having a density of about 10 lbs./cu. ft.

In addition to the reactants in the foregoing examples, polymer foams were also prepared from the reactants set forth in the following table. In each example, an intimate mixture of reactants is achieved by either evaporating a solution of the reactants or grinding the ingredients in a mortar and pestle followed by heating for as long as 30 minutes at temperatures up to 350° C. Dense incompressible foams are obtained.

EXAMPLE XXIV 32.2 grams of benzophenone tetracarboxylic acid dianhydride and 10.8 grams of m-phenylene diamine were ball-milled to obtain a uniform finely divided mixture having a percent volatile content of 9.5. This mixture was TABLE 1.—EXAMPLES OF FREE POLYCARBOXYLIC ACIDS AND POLYAMINES USED TO PREPARE POLYIMIDE FOAMS

| Examples: | Acid moiety | Amount, grams | Amine moiety | Amount, grams | Percent volatiles |
|---|---|---|---|---|---|
| VII | PMA | 2.54 | m-PDA | 1.08 | 20.8 |
| VIII | PMA | 2.54 | MDA | 1.98 | 15.7 |
| IX | PMA | 2.54 | Melamine | 0.84 | 20.1 |
| X | TTA | 2.60 | do | 0.84 | 23.3 |
| XI | TTA | 2.60 | MDA | 1.98 | 15.7 |
| XII | TTA | 2.60 | ODA | 2.00 | 15.0 |
| XIII | 1,2,4,5-NTEA | 3.04 | m-PDA | 1.08 | 15.5 |
| XIV | 1,2,4,5-NTEA | 3.04 | MDA | 1.98 | 14.0 |
| XV | 1,2,4,5-NTEA | 3.04 | MEM | 1.52 | 15.9 |
| XVI | 1,4,5,8-NTEA | 3.04 | m-PDA | 1.08 | 17.8 |
| XVII | 1,4,5,8-NTEA | 3.04 | MDA | 1.98 | 14.9 |
| XVIII | 1,4,5,8-NTEA | 3.04 | ODA | 2.00 | 14.6 |
| XIX | BTA | 3.58 | BIM | 1.28 | 13.7 |
| XX | MA | 3.42 | m-PDA | 1.62 | 21.5 |
| XXI | MA | 3.42 | MDA | 2.97 | 16.9 |
| XXII | MA | 3.42 | ODA | 3.00 | 16.8 |

Legend

BIM—Bis(3-methyl-4,6-diaminophenyl)-methane
BTA—Benzophenonetetracarboxylic acid
MA—Mellitic acid
MDA—Methylene dianiline
MEM—3-methyl-4,6,4'-triaminodiphenyl methane
m-PDA—Meta-phenylene diamine
NTEA—Naphthalene tetracarboxylic acid
ODA—4,4'-oxydianiline
PMA—Pyromellitic acid
TTA—Thiophene tetracarboxylic acid sprinkled in a tray and heated at 300° C. for 10 minutes to give a dense non-burning foam.

The examples in the following Table 2 are set forth to illustrate the variations in the anhydride component and the polyamine component that one might use in the practice of this invention. In each example, a finely ground uniform mixture of reactant is obtained using a mortar and pestle. The reactants are then heated for at least ten minutes at temperatures up to 350° C. to give dense, rigid foams.

TABLE 2.—EXAMPLES OF POLYCARBOXYLIC ACID ANHYDRIDES AND POLYAMINES USED TO PREPARE POLYIMIDE FOAMS

| Examples: | Acid moiety | Amount, grams | Amine moiety | Amount, grams | Percent volatiles |
|---|---|---|---|---|---|
| XXV | PMDA | 2.18 | p-PDA | 1.08 | 11.2 |
| XXVI | PMDA | 2.18 | MDA | 1.98 | 8.9 |
| XXVII | PMDA | 2.18 | ODA | 2.00 | 8.0 |
| XXVIII | TTDA | 6.72 | MEM | 4.54 | 10.1 |
| XXIX | 1,2,4,5-NTDA | 2.68 | m-PDA | 1.08 | 9.6 |
| XXX | 1,2,4,5-NTDA | 2.68 | MDA | 1.98 | 7.8 |
| XXXI | 1,2,4,5-NTDA | 2.68 | ODA | 2.00 | 6.2 |
| XXXII | MAN | 2.88 | MEM | 2.27 | 10.5 |

The examples in Table 1 also serve to illustrate the use of a hexacarboxylic acid (Examples XX–XXII), triamine components (Examples IX, X, XV) and tetraamino components (Example XIX).

The following examples are set forth to show the preparation of polymer foams using acid anhydrides in place of the free acids used in the foregoing examples.

EXAMPLE XXIII 32.2 grams of benzophenone tetracarboxylic acid dianhydride (BTDA) and 19.8 grams of methylene dianiline (MDA) are ball-milled for one hour to obtain a finely ground uniformly blended powder. This powder, which is found to have a volatile content of 7.3% is sprinkled in an aluminum tray and heated at 300° C. for 10 minutes to produce a tough, vitreous foam with a density of about 23 lbs./cu. ft. This foam did not burn when held in an open flame and microscopic examination of the foam disclosed a thin, vitreous closed cell structure.

Legend

MAN—Mellitic anhydride
MDA—Methylene dianiline
MEM—3-methyl-4,6,4'-triaminodiphenyl methane
m-PDA—Meta-phenylene diamine
NTDA—Naphthalene tetracarboxylic acid dianhydride
ODA—4,4'-oxydianiline
PMDA—Pyromellitic acid dianhydride
TTDA—Thiophene tetracarboxylic acid dianhydride It should be noted that solvent based systems wherein the reactive components are dissolved in a common solvent can only be used with the free polycarboxylic acids and cannot be used with the polycarboxylic acid anhydrides as these letter materials react readily with the polyamine component in solvent systems to form polyamic acid polymers without foaming.

The advantage of using solvent based systems is that a more uniform mixture of reactants is achieved than is obtained by merely grinding the reactants. These solutions may be evaporated down to various volatile contents using reduced heat and vacuum conditions, if necessary, in order to maintain a temperature below that at which polymerization and foaming takes place.

When solvent based systems of polycarboxylic acids and polyamines are used, it is preferred that they have a solids content (weight of carboxlyic acid and amine reactants/weight of total system×100%) of greater than 50% and more preferably greater than 75%.

The preferred solvents for use with the free tetracarboxylic acids in the practice of this invention are any liquids which are non-reactive solvents for the acid and amine components and which have a boiling point below the minimum reaction temperature necessary to polymerize the reactants. The use of solvents with boiling points above the reaction temperature of the co-reactants will necessitate the use of vacuum conditions at temperatures below the minimum reaction temperature of the system in evaporating the solvent to obtain a sustantially dry mixture of reactants in order to avoid premature polymerization of the reactants with a subsequent loss in the volatile content of the reactant system. When these higher boiling solvents are used, the system is preferably evaporated down to a volatile content not more than 10% above the theoretical maximum and more preferably to a volatile content of not more than 5% above the theoretical volatile content of the system in order to obtain a foam structure.

The choice of a solvent will be further dictated by the solubility of the reactants used. In general, one may use non-reactive organic solvents, e.g. esters; ketones such as acetone, methyl ethyl ketone, methyl isobutyl ketone; water and aqueous ammonia; dioxane, certain hydrocarbons and the other solvents which are so well known to those skilled in the polyimide art that they need no further teaching here.

An intimate mixture of reactants may be readily obtained by mechanical blending of the polycarboxylic acid and polyamine components using means such as ball mills, mortar and pestle, high impact grinding, ultrasonic grinding, etc.

The properties of the foams of this invention that are prepared from dry reactants e.g., density, texture, etc. may be altered by moistening the reactants with liquids such as alcohols, water, esters, ketones, pyrrolidones, surfactants, antifoaming agents, etc. These materials are used merely to wet the powders and do not necessarily have to be solvents for the materials.

Foams prepared by heating the reactants at temperatures in excess of 200° C. for up to 30 minutes or at lower temperatures for longer periods of time are characterized by a polyimide structure as is evidence by insolubility in cold basic reagents, such as N-methyl pyrrolidone which are good solvents for the reactants and as well as for polyamic acids. Infra-red absorption data on the foam structure also indicates a polyimide structure as indicated by the bands at 5.64, 5.89 and 13.85 microns. Foams prepared using esters of benzophenone tetracarboxylic acid are further characterized by a ketiimine structure as is evidence by I.R. absorption bands at 6.18 microns. Foams prepared from monomeric reactants characterized by having two benzoid rings connected by amide groups, as is discussed below, will also contain amide groups.

If desired, the foams prepared in accordance with the practice of this invention may be post-cured at elevated temperatures e.g. 200–300° C. to insure the elimination of all volatiles and in some instances to toughen and preshrink the foam before its final end use.

The starting materials for forming the products of the present invention are polyamines and polycarboxlyic acid compounds containing from 4 to 6 carboxylic acid groups.

The polyamines include diamines characterized by the formula: $H_2N-R-NH_2$ wherein R is a divalent radical selected from the following groups: aromatic, aliphatic, cycloaliphatic, combination of aromatic and aliphatic, heterocyclic and bridged organic radicals wherein the bridge is alkylene of from 1 to 6 carbon atoms, oxygen, arylene of from 6 to 16 carbon atoms, —NH—, sulfur, sulfonyl, phosphorous, carbonyl, phosphonyl, silicon and derivatives thereof. The preferred R groups in the diamines are those aromatic groups containing at least 6 carbon atoms and characterized by benzenoid unsaturation. Such R groups include paraphenylene, meta-phenylene, bisphenyl radicals, fused ring systems having 2–4 aromatic nuclei, wherein the two amine groups would be located on separate aromatic nuclei and bridged organic radicals of the general formula:

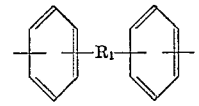

wherein $R_1$ is an alkylene of from 1–6 carbon atoms, arylene of from 6–16 carbon atoms, oxygen, —NH—, carbonyl, sulfur, sulfonyl, phosphorus, phosphonyl, silicon and derivatives thereof. The foregoing structure also contemplates having the $R_1$ group connected to the aromatic nuclei by ester, amide and thioester linkages.

Among the diamines which are suitable for use in the present invention are: meta-phenylene diamine; para-phenylene diamine; 4-4'-diamino-diphenyl propane; 4,4'-diamino-diphenyl methane; benzidine; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl) diethyl silane; bis - (4 - amino - phenyl) diphenyl silane; bis - (4 - aminophenyl)-N-methylamine; 1,5-diamino naphthalene; 3,3'-dimethyl-4,4'-diamino-diphenyl; 3,3'-dimethoxy benzidine; 2,4-bis (beta-amino-t-butyl) toluene; bis-(para-beta-amino-t-butyl-phenyl) ether; para-bis-(2-methyl-4-amino-pentyl) benzene; para-bis-(1,1-dimethyl-5-amino-pentyl) benzene; m-xylylene diamine; p-xylylene diamine; bis-(para-amino-cyclohexyl)methane; hexamethylene diamine; heptamethylene diamine; octamethylene diamine; nonamethylene diamine; decamethylene diamine; 3-methylheptamethylene diamine; 4,4-dimethylheptamethylene diamine; 2,11-diamine-dodecane; 1,2-bis-(3-amino-propoxy)ethane; 2,2-dimethyl propylene diamine; 3-methoxy-hexamethylene diamine; 2,5-dimethyl-hexamethylene diamine; 2,5-dimethyl-heptamethylene diamine; 5-methylnonamethylene diamine; 1,4-diamino cyclohexane; 1,12-diamino - octadecane; 2,5 - diamino - 1,3,4, - oxadiazole; $H_2N(CH_2)_3O(CH_2)_2O(CH_2)_3NH_2$;

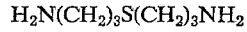

$H_2N(CH_2)_3N(CH_3)(CH_2)_3NH_2$; 3,3'-dichlorobenzidine; bis-(4-amino-phenyl) ethyl phosphine oxide; bis-(4-amino-phenyl)-phenyl phosphine oxide; bis-(4-amino-phenyl)-N-phenylamine; p-phenylene-bis-2-(amino-1,3-benzoxazole); 2,5-bis-(p-amino phenyl)-1,3,4-oxadiazole; m-phenylene-bis (m-aminobenzamide); 3,4-diamino benzanilide and mixtures thereof.

Other polyamines which contain from 3 to 6 amine groups per molecule may also be used. Examples of such suitable polyamines include melamine, tris-(4-aminophenyl)methylcarbinol, 3-methyl-4,6,4'-triaminodiphenyl-methane, 1,2,4-benzenetriamine, 1,3,5-triaminobenzene, 2,4,4'-bis-phenyltriamine, the various triaminodiphenyl ethers, tetraaminodiphenyl ethers, hexaaminodiphenyl ethers, etc., the various triaminodiphenyl sulfides, tetraaminodiphenyl sulfides, pentaaminodiphenyl sulfides, hexaaminodiphenyl sulfides, etc., 3,3'-diaminobenzidine, bis(3-methyl-4,6-diaminophenyl)-methane; and the various tri, tetra, penta and hexa-aminodiphenyl alkylene compounds wherein the two phenyl groups are bridged by an alkylene of from 1 to 6 carbon atoms, arylene of from 6 to 16 carbon atoms, oxygen, —NH—, carbonyl, sulfur, sulfonyl, phosphorous, phosphonyl and silicon and derivatives thereof.

The preferred polyamines for use in this invention are the diamines. Especially preferred are the diamines set forth above wherein R is an aromatic group containing at least 6 carbon atoms and characterized by benzoid unsaturation.

The carboxylic acid compounds used in the practice of this invention are polycarboxylic acids and polycarboxylic anhydrides containing from 4 to 6 carboxylic acid groups.

Examples of these compounds include tetracarboxylic acids such as 3,4,3',4' benzophenone tetracarboxylic acid; 2,3,2',3' benzophenone tetracarboxylic acid; 2,3,3',4' benzophenone tetracarboxylic acid, pyromellitic acid; 2,3,6,7-naphthalene tetracarboxylic acid; 3,4,3',4' diphenyl tetracarboxylic acid; 1,2,5,6-naphthalene tetracarboxylic acid; 2,3,2',3' - diphenyltetracarboxylic acid; 2,2 - bis(3,4 - dicarboxyphenyl)propane acid; bis-(3,4- dicarboxyphenyl) - sulfone acid; 3,4,9,10 - perylene tetracarboxylic acid; bis(3,4 - dicarboxyphenyl) ether acid; ethylene tetracarboxylic acid; naphthalene 1,2,4,5-tetracarboxylic acid; naphthalene - 1,4,5,8 - tetracarboxylic acid; decahydronaphthalene - 1,4,5,8 - tetracarboxylic acid; 4,8 - dimethyl - 1,2,3,5,6,7 - hexahydronaphthalene- 1,2,5,6 - tetracarboxylic acid; 2,6 - dichloronaphthalene - 1,4,5,8 - tetracarboxylic acid; 2,7 - dichloronaphthalene- 1,4,5,8 - tetracarboxylic acid; 2,3,6,7 - tetrachloronaphthalene - 1,4,5,8 - tetracarboxylic acid; phenanthrene - 1,8,9,10 - tetracarboxylic acid; cyclopentane - 1,2,3,4 - tetracarboxylic acid; pyrrolidine - 2,3,4,5 - tetracarboxylic acid; pyrazine - 2,3,5,6 - tetracarboxylic acid; 2,2 - bis(2,3-dicarboxyphenyl)propane acid; 1,1 - bis(2,3 - dicarboxyphenyl) ethane acid; 1,1 - bis(3,4 - dicarboxyphenyl) ethane acid; bis(2,3 - dicarboxyphenyl) methane acid; bis(3,4 - dicarboxyphenyl) methane acid; bis - (3,4 - dicarboxyphenyl) sulfone acid; benzene-1,2,3,4-tetracarboxylic acid; 1,2,3,4-butane tetracarboxylic acid and thiophene-2,3,4,5-tetracarboxylic acid, etc.

The carboxylic acid component also includes pentacarboxylic and hexacarboxylic acids such as mellitic acid.

It is to be fully understood that the practice of this invention also contemplates using the anhydride derivatives of the foregoing polycarboxylic acids in the practice of this invention.

Other tetracarboxylic compounds useful in the practice of this invention are tetracarboxylic, two benzenoid ring structures formed from two molecules of trimellitic anhydride joined through their free carboxylic groups.

These trimellitic derivatives are obtained by the condensation of two mols of trimellitic anhydride with one mol of another compound which is at least difunctional. The resulting tetracarboxylic structure therefore consists of two benzene rings, each having two carboxyl group substituents attached to adjacent carbon atoms, and joined together by any of the following linkages; amide, ester and thioester. Examples of specific compounds of this class are the condensation products of two mols of trimellitic anhydride with one mol of such molecules as glycol diacetate, triacetin, tolylene diisocyanate, methylene-bis(4 - phenylisocyanate) and oxy-bis (4-phenylisocyanate) and a bisphenol such as 2,2 - bis(p-hydroxyphenyl)propane. Similarly, other tetracarboxylic monomers may be obtained from trimellitic anhydride and derivatives of compounds such as ethanolamine, oxydianiline, phenylene diamine, diaminodiphenylamine, diaminodiphenylmethane, diaminodiphenyl-propane, ethylene dithiol, 1-thioglycerol, α,α-dimercapto-p-xylene, 4,4'-diaminobenzophenone, and the like.

These trimellitic derivatives may be generally represented by the following structural formula:

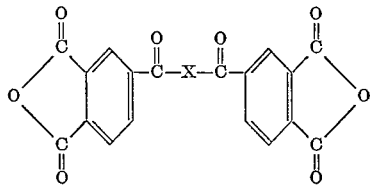

wherein X represents any of the compounds recited above, which are at least difunctional and which react with the two mols of trimellitic anhydride joining them together by either amide, ester or thioester linkages.

Prior to use in the practice of this invention, the anhydride structure on either the trimellitic anhydride or the derivatives of trimellitic anhydride may optionally be converted to form the free carboxylic acid derivatives by any of the methods well known to those skilled in the art.

The preferred polycarboxylic acid compounds are the tetracarboxylic acids and their anhydride derivatives. Especially preferred are the isomers of benzophenone tetracarboxylic acid and benzophenone tetracarboxylic dianhydride and the derivatives of trimellitic anhydride.

The preferred tetracarboxylic acids may be represented generally by the following structural formulae:

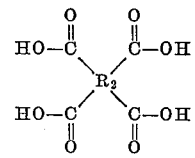

whrein $R_2$ is a tetravalent radical selected from the group consisting of tetravalent radicals of the general structure:

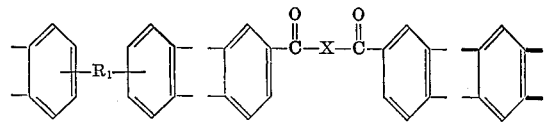

wherein $R_1$ is an alkylene of from 1 to 6 carbon atoms, arylene of from 6 to 16 carbon atoms, oxygen, —NH—, carbonyl, sulfur, sulfonyl, phosphorous, phosphonyl, silicon and derivatives thereof, and X is a difunctional compound joining the two benzoid ring structures together by ester, amide or thioester linkages.

The following example is set forth to illustrate the derivatives of trimellitic anhydrides in the practice of this invention.

EXAMPLE XXXIII 8.2 grams (0.020 mol) of the isomeric mixture of dianhydrides prepared from two mols of trimellitic anhydride and one mol of ethylene glycol diacetate, which may be represented generally by the structural formula:

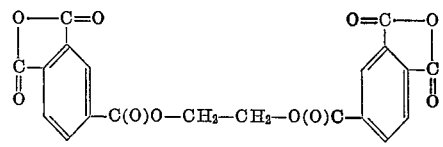

are dry blended with 6.0 grams (0.03 mol) of 4,4'-oxydianiline using a mortar and pestle to give a system with a volatile content of 10.7%. This material is then heated at 320° C. to give a foam comparable to that obtained in Example XXIII.

The proportions of reactants can vary, on a molar basis from about a 50% excess of the carboxylic ester compound to a 50% excess of the polyamine. Preferred however is a 10% excess of either reactant and especially preferred are chemically equivalent amounts of both types of reactants.

In regard to the percent volatile content, it should be noted that for equivalent amounts of an amine monomeric component and a carboxylic acid monomeric component, the numerical value for the percent volatiles due solely to evolution of water of condensation will vary with the size and weight of the amine component and the carboxylic acid component as is well known to those skilled in the art.

In general the percent volatile content of the system should be at least 6.2% and preferably at least 8.0% wherein the volatile content is due to the evolution of the water of condensation.

The upper limit is not as critical as the lower limit as is evidenced by the working examples. In general, the upper limit for the percent volatiles content is about 97% and preferably 75%. More preferably the upper limit should not be greater than 50%.

It should be obvious to those skilled in the art that in cases where the volatile content of the system is greater than that theoretical maximum due solely to the water of condensation, the excess is due to any solvent or other additives used in the systems, e.g. surface active agents, wetting agents, catalysts, etc.

The uses of temperatures which are at least 75° C. above the polymerization reaction temperature of the co-reactants is to be preferred. Especially preferred is the use of temperatures which are at least 100° C. above the polymerization reaction temperature of the co-reactants. Most especially preferred is the use of temperatures which are at least 125° C. above the polymerization reaction temperature of the co-reactants.

The concept of this invention includes the use of tertiary amines such as pyridine, picoline, quinoline, etc., which will accelerate the forming of the polyimide foam or allow foam formation to occur at lower temperatures. In general up to 10% by weight of these reagents may be used. Vacuum methods, e.g., foaming at sub-atmospheric pressures are also contemplated as means to accelerate the foaming process or to allow foaming at lower temperatures.

While the reactants set forth in this invention are self-foaming and do not require external foaming means such as mechanical agitation, gas delivery tubes or blowing agents, such means may be useful in controlling cell size and shape and foam texture and density and are included in the concept of this invention. Also contemplated in the preparation of these polyimide foams is use of nucleating agents, surface active agents, fillers and fibrous reinforcing agents such as glass, asbestos, silica, refrasil, quartz and boron fiber. Metallic fillers such as aluminum microballoons are also useful in changing the physical properties of the polyimide foams.

The interaction of the polycarboxylic acids and polyamines to form polyimide foams may be carried out in trays or vented containers or molds as is illustrated in the working examples. The foams may be formed around reinforcing members by dipping a reinforcing member into a solution or into dry intimate mixtures of monomeric reactants and then heating the systems to form a polymer foam around the reinforcing member. However, these methods should not be construed as limiting. The scope of this invention also contemplates the use of commercial foaming equipment such as extruders, injection foam molding machines, etc., as is well known to those skilled in the foaming art.

It is obvious that many deviations may be made in the products and processes set forth above without departing from the scope of this invention.

What is claimed is:

1. A process for the preparation of a polyimide foam which is the reaction product of
   (A) at least one tetracarboxylic acid compound selected from the group consisting of tetracarboxylic acids and tetracarboxylic acid dianhydrides and mixtures thereof; and
   (B) at least one polyamine selected from the groups consisting of amino compounds containing from 2 to 6 amino groups per molecule, wherein the process comprises mixing at least one component from (A) and (B) above to form a system with a volatile content of at least 6.2% and then heating this mixture to at least the temperature at which foaming occurs contemporaneously with the polymerization of the tetracarboxylic acid and polyamine components.

2. The process of claim 1 wherein the tetracarboxylic acid compound corresponds to the general formula

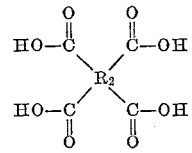

wherein $R_2$ is a tetravalent radical selected from the group consisting of tetravalent radicals of the general structure

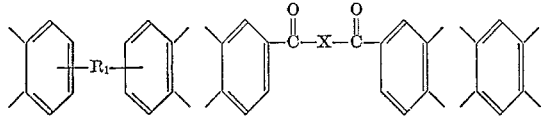

wherein $R_1$ is a divalent radical selected from the group consisting of alkylene radicals of from 1 to 6 carbon atoms, arylene radicals of from 6 to 16 carbon atoms, oxygen, —NH—, carbonyl, sulfonyl and phosphonyl, and wherein X is a divalent compound joining the two benzoid ring structures together through ester, amide or thioester linkages.

3. The process of claim 2 wherein the tetracarboxylic compound is benzophenone tetracarboxylic acid.

4. The process of claim 1 wherein the polyamine corresponds to the general formula; $H_2N–R–NH_2$ wherein R is a divalent radical selected from the group consisting of alkylene radicals of from 1 to 6 carbon atoms, arylene radicals of from 6 to 16 carbon atoms, bisphenylene radicals and bridged phenyl radicals of the general formula

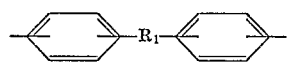

wherein $R_1$ is a divalent radical selected from the group consisting of alkylene radicals of from 1 to 6 carbon atoms, arylene radicals of from 6 to 16 carbon atoms, oxygen, —NH—, carbonyl transfer to of galley sulfonyl; and phosphonyl.

5. The process of claim 1 wherein the polyamine is selected from the group consisting of meta and para phenylene diamine, 4,4'-oxydianiline, and methylene dianiline.

6. The process of claim 1 wherein the mixing step comprises dissolving the free tetracarboxylic acid and the polyamine in a common nonreactive solvent followed by evaporation of the solvent at temperatures below the minimum reaction temperature of the system to give a molecular dispersion of the reactants.

7. The process of claim 1 wherein the mixing step comprises intimately blending a finely-ground solid tetracarboxylic acid compound and a finely ground solid polyamine compound.

8. A process for the preparation of a polyimide foam which is the reaction product of
   (A) benzophenone tetracarboxylic acid; and
   (B) an aromatic diamine wherein the process comprises mixing the benzophenone tetracarboxylic acid and the diamine to form a system having a volatile content of at least 8% and then heating this mixture to at least that temperature at which foaming occurs contemporaneously with the polymerization of the benzophenone tetracarboxylic acid and the aromatic diamine.

9. A process as in claim 8 wherein the mixture is heated at a temperature which is at least 75° C. above the temperature at which foaming occurs contemporaneously with the polymerization of the benzophenone tetracarboxylic acid and the aromatic diamine.

10. A process as in claim 9 wherein the aromatic diamine is selected from the group consisting of meta and para phenylene diamine, 4,4'-oxydianiline, and methylene dianiline.

11. A process for the preparation of a polyimide foam which is the reaction product of (A) benzophenone tetracarboxylic acid dianhydride; and
(B) an aromatic diamine wherein the process comprises mixing the benzophenone tetracarboxylic acid dianhydride and the diamine to form a system having a volatile content of at least 8% and then heating this mixture to at least that temperature at which foaming occurs contemporaneously with the polymerization of the benzophenone tetracarboxylic acid diahydride and the aromatic diamine.

12. A process as in claim 11 wherein the mixture is heated at a temperature which is at least 75° C. above the temperature at which foaming occurs contemporaneously with the polymerization of the benzophenone tetracarboxylic acid dianhydride and the aromatic diamine.

13. A process as in claim 12 wherein the aromatic diamine is selected from the group consisting of meta and para phenylene diamine, 4,4'-oxydianiline, and methylene dianiline.

References Cited

UNITED STATES PATENTS

| | | |
|---|---|---|
| 3,249,561 | 5/1966 | Hendrix. |
| 3,310,506 | 3/1967 | Amborski et al. |
| 3,347,808 | 10/1967 | Lavin et al. |

MURRAY TILLMAN, Primary Examiner

M. FOELAK, Assistant Examiner

U.S. Cl. X.R.

117—161; 260—47, 65, 78

PO-1050
(5/69)

UNITED STATES PATENT OFFICE
CERTIFICATE OF CORRECTION

Patent No. 3,483,144            Dated December 9, 1969

Inventor(s) Edward Lavin & Irving Serlin

It is certified that error appears in the above-identified patent and that said Letters Patent are hereby corrected as shown below:

Column 4, line 3, "polyamide" should read --- polyimide ---.

Claim 4 second last line, "transfer to of galley" should be deleted.

SIGNED AND
SEALED
MAY 12 1970

(SEAL)
Attest:

Edward M. Fletcher, Jr.
Attesting Officer

WILLIAM E. SCHUYLER, Jr.
Commissioner of Patents